United States Patent [19]

Iwakami

[11] Patent Number: 4,752,942

[45] Date of Patent: Jun. 21, 1988

[54] METHOD AND CIRCUITRY FOR EXTRACTING CLOCK SIGNAL FROM RECEIVED BIPHASE MODULATED SIGNAL

[75] Inventor: Takuya Iwakami, Tokyo, Japan

[73] Assignee: NEC Corporation, Japan

[21] Appl. No.: 687,651

[22] Filed: Dec. 31, 1984

[30] Foreign Application Priority Data

Jan. 9, 1984 [JP] Japan .................................. 59-1634

[51] Int. Cl.[4] .......................... H04L 7/02; H03D 3/18
[52] U.S. Cl. ................................ 375/110; 375/87; 360/42; 307/518; 328/72
[58] Field of Search ............................ 375/110, 87, 82; 328/55, 72; 307/517, 518, 269; 360/42

[56] References Cited

U.S. PATENT DOCUMENTS

| 4,085,288 | 4/1978 | Viswanathan | 375/120 |
| 4,088,832 | 5/1978 | Eastmond | 375/110 |
| 4,313,206 | 1/1982 | Woodward | 375/110 |
| 4,513,427 | 4/1985 | Borriello | 375/110 |
| 4,525,848 | 6/1985 | Simpson | 375/87 |
| 4,599,736 | 7/1986 | Hoppe | 375/110 |

Primary Examiner—Robert L. Griffin
Assistant Examiner—Marianne Huseman
Attorney, Agent, or Firm—Laff, Whitesel, Conte & Saret

[57] ABSTRACT

A clock pulse is derived from a received biphase modulated signal by feeding the biphase modulated signal and a signal indicative of the time points at which a code ONE of the received signal changes to a code ZERO and vice versa, to an exclusive OR circuit.

5 Claims, 7 Drawing Sheets

METHOD AND CIRCUITRY FOR EXTRACTING CLOCK SIGNAL FROM RECEIVED BIPHASE MODULATED SIGNAL

BACKGROUND OF THE INVENTION

1. Field of The Invention

The present invention relates to a method and circuitry for obtaining a locally-generated clock signal according to a received biphase modulated signal. The clock signal is utilized to reproduce original binary data from the received biphase modulated signal.

2. Description of the Prior Art

It is known in the art that a digital data communication system using biphase codes (or Manchester codes) features that (a) a data quality is not adversely affected during transmission by transmission paths with low-frequency cutoff characteristics in that the biphase codes include no direct current components and (b) the original data can be converted into the corresponding biphase codes and then reproduced with quite simple circuit arrangements.

Before going into details of prior art, reference will first be made to FIGS. 1 through 3 in order to describe the known principles of converting an original binary NRZ (nonreturn-to-zero) data into the corresponding biphase codes and reproducing the original data.

Figure 1:
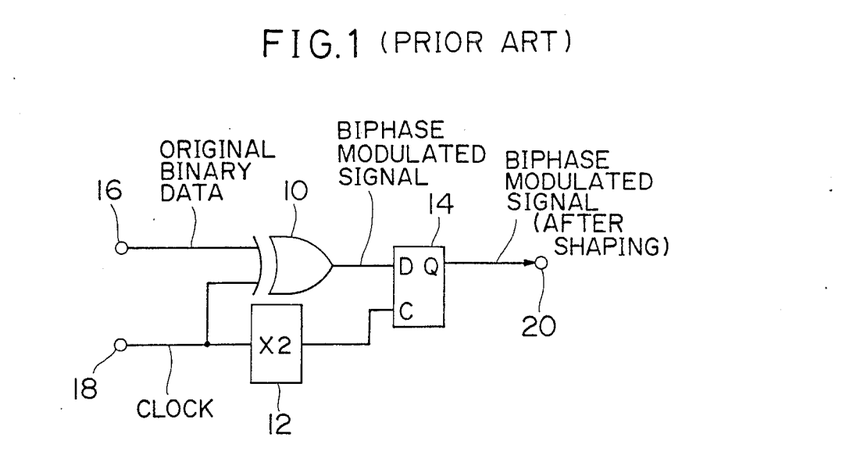
FIG. 1 is a block diagram showing a known modulator or biphase converter for converting an original binary NRZ data into the corresponding biphase code sequence, as previously referred to in the opening paragraphs of the present disclosure.
Figure 2:
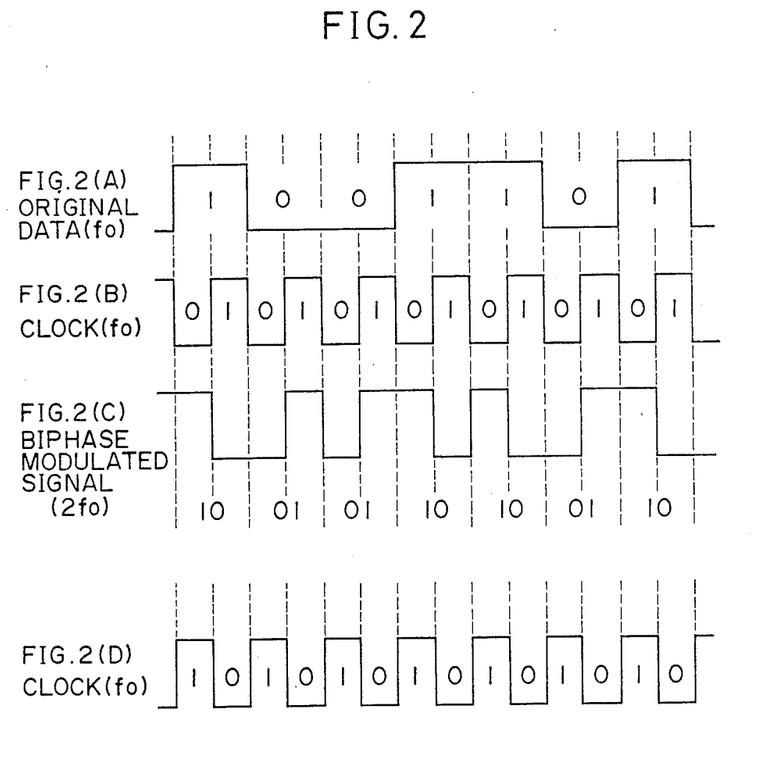
FIGS. 2a–2d are signal waveforms helpful in explaining the prior art shown in FIGS. 1 and 3, as previously referred to in the opening paragraphs of the present disclosure.

FIG. 1 is a block diagram showing a simplified known converter or modulator wherein the original binary NRZ data are converted into the corresponding biphase codes. The FIG. 1 arrangement includes an exclusive OR circuit 10, a frequency doubler 12 and a D flip-flop 14. The exclusive OR circuit 10 has one input coupled to receive the original binary NRZ data with a frequency $f_0$ applied to an input terminal 16, and the other input coupled to receive a clock signal having the frequency $f_0$ via an input terminal 18. The exclusive OR circuit 10 generates a biphase modulated code sequence by appropriately adjusting the phase relation between the original data and clock signal applied.

FIGS. 2(A) and 2(B) respectively illustrates examples of waveforms of the original NRZ data and clock signal, while FIG. 2(C) illustrates the waveform of the resulting biphase modulated code sequence which is taken from the output of the exclusive OR circuit 10. The D flip-flop 14 and frequency doubler 12 form a wave-shaping section for shaping the waveforms of the output signal of the exclusive OR circuit 10. The wave-shaping section is preferably provided in case the repetition rate of the biphase modulated codes is high but dispensable in the event that the repetition rate is not so high. The biphase modulated signal thus obtained is transmitted to a remote receiver.

Figure 3:
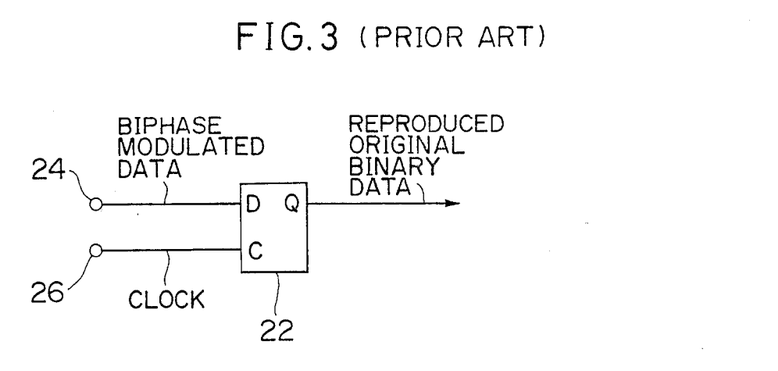
FIG. 3 is a block diagram showing a known demodulator for reproducing original binary NRZ data, as previously referred to in the opening paragraphs of the present disclosure.

FIG. 3 is a block diagram showing a known detector for reproducing the original binary data from the received biphase modulated signal. The FIG. 3 arrangement includes a single D flip-flop 22. The D flip-flop 22 has a data input (D) connected to receive the biphase modulated signal through an input terminal 24, and has a clock input (C) coupled to receive via a terminal 26 a clock signal having the frequency $f_0$. The waveform of this clock signal is illustrated in FIG. 2(D). It will be appreciated that the D flip-flop 22 reproduces the original binary data at the output (Q) thereof by adjusting the phase relation between the two inputs thereto.

Reference to FIGS. 1 and 3 shows that the original data can be converted into the corresponding biphase codes and then reproduced with quite simple circuit arrangements.

In the FIG. 3 circuit, if the clock signal differs in phase by 180° from the phase depicted in FIG. 2(D), then the polarities of the reproduced original data are reversed. In order to avoid such a problem, it is known in the art that the original binary data is differentially decoded before being converted into the corresponding biphase codes, and are differentially decoded after being reproduced.

As shown in FIG. 3, the clock signal is vital to the reproduction of the original binary data. Since the converter or modulator (FIG. 1) and detector (FIG. 3) are usually separated, it is desirable to transmit data only instead of both data and clock signal. In this instance, it is necessary to extract the clock signal from the received biphase modulated signal.

Figure 4:
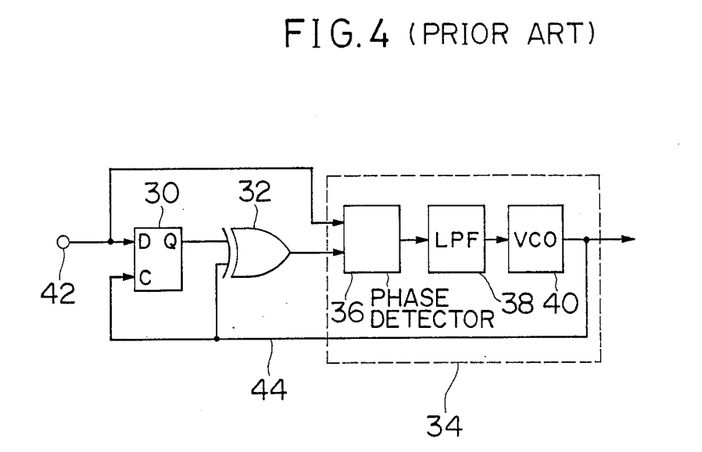
FIG. 4 is a block diagram showing a known biphase detector which reproduces original (or modulation) data using an extracted clock signal, as previously referred to in the opening paragraphs of the present disclosure.

FIG. 4 is a block diagram showing a known biphase detector for reproducing original (or modulation) data using a clock (or reference) signal which is extracted therein. The FIG. 4 arrangement includes a D flip-flop 30, and a phase-locked loop formed by an exclusive OR circuit 32 and a phase-locked oscillator 34. The oscillator 34 consists of a phase detector 36, a low-pass filter 38, and a voltage-controlled oscillator (VCO) 40. The D flip-flop 30 has one input (data input D) coupled to receive a biphase modulated signal applied to a terminal 42, and the other input (clock input C) coupled to the output of the VCO 40 via a line 44. The D flip-flop 30 is clocked by a locally-generated clock signal applied from the VCO 40, thereby reproducing an original data as was the case depicted in FIG. 3. However, in the situations where the extracted clock signal varies in phase, the output of the flip-flop 30 varies in phase accordingly. In order to overcome this difficulty, the output of the D flip-flop is again biphase modulated at the exclusive OR circuit 32, the output of which is applied to the phase detector 36 to be compared in phase with the output of the incoming biphase modulated signal. The output of the phase detector 36 is fed, via the low-pass filter 38, to the VCO 40 in order to control same. Consequently, the phase of the locally-generated clock signal is synchronized with that of the incoming biphase modulated signal.

Such a decision feedback type demodulator shown in FIG. 4, however, has encountered some drawbacks that the generation of exact clocks may no longer be expected in the situations where the demodulator is initially switched on or there exist bit errors at the flip-flop output caused by transmitted waveform degradations, etc.

The prior art illustrated in FIG. 4 has been disclosed in the PCT patent application which has received International Publication No. of WO 82/02985 and been published on Sept. 2, 1982.

SUMMARY OF THE INVENTION

It is therefore a primary object of the present invention to provide a method and circuitry which are free from the difficulties encountered with the prior art arrangements discussed hereinabove.

Another object of the present invention is to provide a method of extracting a clock signal from a received biphase modulated signal and circuitry therefor.

Still another object of the present invention is to provide circuitry for extracting a stable clock signal from a received biphase modulated signal, which circuitry can be constructed in a very simple manner.

Still another object of the present invention is to provide circuity for use in a biphase code demodulator or biphase detector, which circuitry locally generates a stable clock signal which is not disturbed by an initial energization of the circuitry and/or signal quality degradations during transmission, etc.

In brief these objects are fulfilled by deriving a clock signal from a received biphase modulated signal by feeding the biphase modulated signal and a signal indicative of the time points at which a binary ONE of the received signal changes to a binary ZERO and vice versa, to an exclusive OR circuit.

An aspect of the present invention takes the form of a method of extracting a clock signal from a received biphase modulated signal, which clock signal is utilized to reproduce an original code data, the method comprises the steps of: receiving the biphase modulated signal; generating a time point detecting signal indicative of time points at each of which a code ONE of the received biphase modulated signal changes to a code ZERO or vice versa; and obtaining the clock signal by performing exclusive OR operations between the time point detecting signal and the received biphase modulated signal.

Another aspect of the present invention takes the form of a circuit arrangement for locally generating a clock signal according to a received biphase modulated signal, which comprises: a first detector having the input thereof coupled to receive the received biphase modulated signal, the first detector being arranged to detect time points at each of which a code ONE of the received biphase modulated signal changes to a code ZERO; a second detector having the input thereof coupled to receive the biphase modulated signal, the second detector being arranged to detect time points at each of which a code ZERO of the received biphase modulated signal changes to a code ONE; a set-and-reset type flip-flop having one input coupled to one of the first and second detectors, and having the other input coupled to the other one of the first and second detectors; and an exclusive OR circuit which receives the output of the flip-flop and the received biphase modulated signal, whereby the clock signal is obtainable at the output of the exclusive OR circuit.

Still another aspect of the present invention takes the form of A circuit arrangement for extrancting a clock signal from a received biphase modulated signal, which comprises: a detector having the input thereof coupled to receive the received biphase modulated signal, the detector being arranged to detect time points at each of which a code ONE of the received biphase modulated signal changes to a code ZERO or vice versa; a binary counter having the input thereof coupled to receive the output of the detector; and an exclusive OR circuit having one input coupled to receive the output of the binary counter and the other input to receive the biphase modulated signal, whereby the clock signal is obtainable at the output of the exclusive OR circuit.

BRIEF DESCRIPTION OF THE DRAWINGS

The features and advantages of the present invention will become more clearly appreciated from the following description taken in conjunction with the accompanying drawings in which like blocks, circuits or circuit elements are denoted by like reference numerals and in which.

DETAILED DESCRIPTION OF THE PREFERRED EMBODIMENTS

Figure 5:
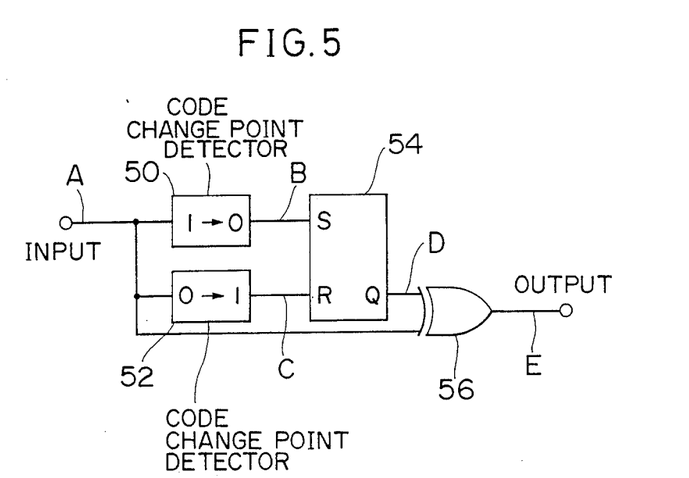
FIG. 5 is a block diagram showing a first embodiment of the present invention.
Figure 6:
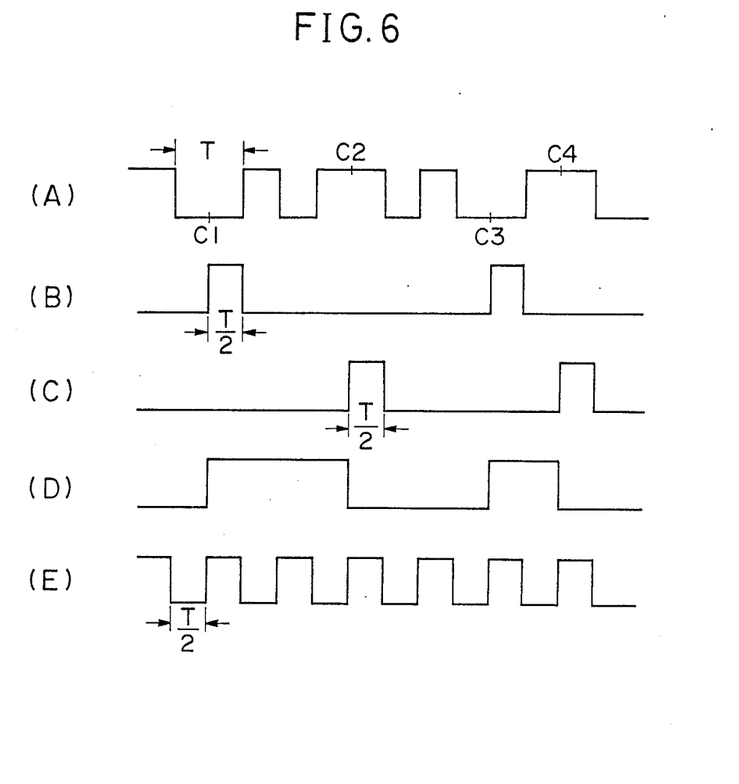
FIG. 6 is a chart showing signal waveforms produced by the first embodiment shown in FIG. 5.

Reference is now made to FIGS. 5 and 6, wherein FIG. 5 is a block diagram showing a first preferred embodiment of the present invention and FIG. 6 illustrates signal waveforms produced by the FIG. 5 arrangement. The waveforms of signals denoted A through E in FIG. 5 are respectively illustrated in FIGS. 6(A) through 6(E). It should be noted that the waveforms of FIG. 6 which are given merely by way of example.

The FIG. 5 arrangement includes a first and second code change point detectors 50 and 52, a set-and-reset type flip-flop 54, and an exclusive OR circuit 56. The detector 50 serves to detect the time points at each of which a code ONE of the incoming biphase modulated signal A changes to a code ZERO (such as time points C1 and C3 (FIG. 6(A)), while the detector 52 is provided for detecting the time points at each of which a code ZERO changes to a code ONE (such as time points C2 and C4 (FIG. 6(A)). The signal A is applied to the detectors 50 and 52 and to one input of the exclusive OR circuit 56. The detector 50 outputs the signal B inclusive of pulses each having a pulse width T/2 (wherein T is a period of the signal A) upon detecting each of the time points C1 and C3, as shown in FIG. 6(B). Similarly, the detector 52 outputs the signal C including pulses each having the pulse width T/2 upon detecting each of the time points C2 and C4, as shown in FIG. 6(C). The flip-flop 54 is supplied, at its set and reset inputs, with the outputs of the first and second detectors 50 and 52, respectively, and hence generates the output D at its Q terminal, the waveform of which is shown in FIG. 6(D). The flip-flop 54 applies its output to the other input of the exclusive OR gate 56 which generates a pulse train E or a clock signal having a pulse width T/2 (FIG. 6(E)). The clock signal E is utilized to reproduce a received original binary data, as was the case depicted in FIG. 3.

Figure 7:
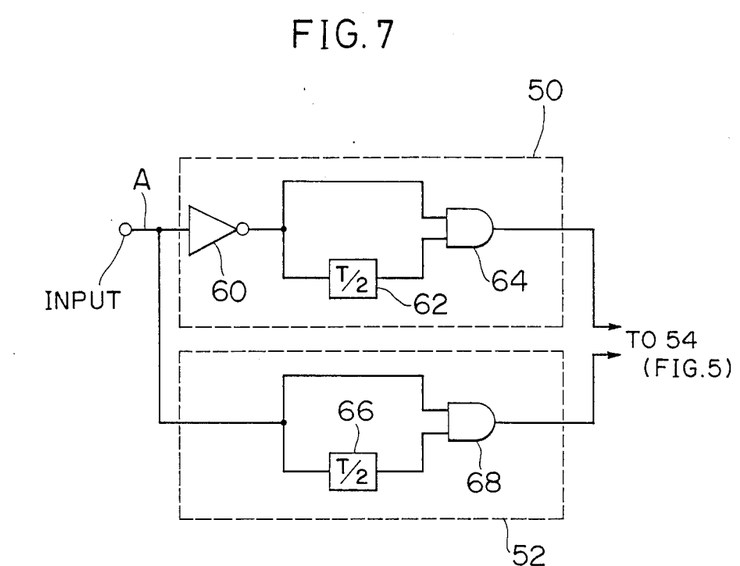
FIG. 7 is a block diagram showing detailed circuit configurations of the blocks forming part of the FIG. 6 arrangement.

FIG. 7 is a block diagram showing the details of the detectors 50 and 52. As shown, the detector 50 includes an inverter 60, a delay circuit 62 for delaying the signal A by the time inverval T/2, and an AND circuit 64, while the detector 52 includes a delay circuit 66 of same type as the delay circuit 62, and an AND circuit 68. It will readily be appreciated that the detectors 50 and 52 (FIG. 7) generate the signals shown in FIGS. 6(B) and 6(C) respectively when receiving the signal shown in FIG. 6(A).

If the clock signal, which is obtained at the output of the exclusive OR circuit 56, differs in phase by 180° from the phase depicted in FIG. 6(E), then the polarities of the reproduced original data are reversed. It will be recalled that such a problem can be overcome by the known techniques of: (a) differentially coding the original binary data before converting same into the corresponding biphase codes and (b) differentially decoding the reproduced original data.

Figure 8:
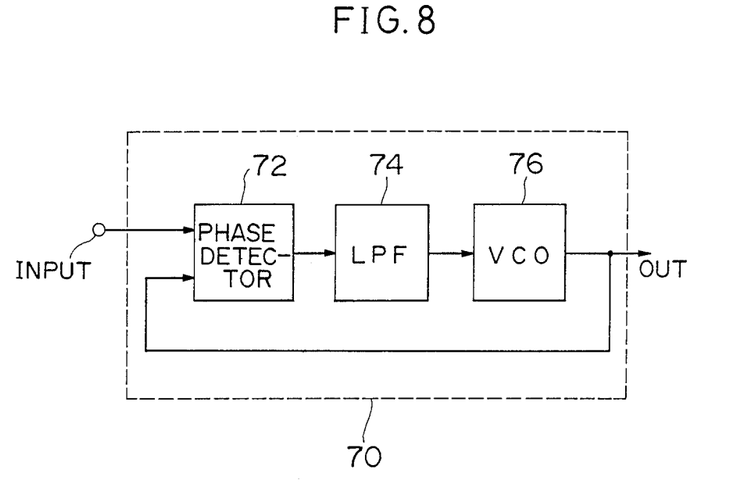
FIG. 8 is a block diagram showing a known phase-locked loop which may be utilized with the present invention.

The circuitry shown in FIGS. 5 through 7 operates without problem when the repetition rate of the incoming signal is in a low range wherein the logic elements of the circuitry operate normally. However, when the circuitry operates in a high repetition range wherein there exist jitter and waveform degradations to an extent which cannot be neglected and/or when the waveform per se of the incoming signal is deteriorated during transmission, then a known phase-locked loop (PLL) 70 shown in FIG. 8 is coupled to follow the FIG. 5 arrangement. As shown, the PLL 70 includes a phase detector 72, a low-pass filter 74 and a voltage-controlled oscillator 76. The provision of the PLL 70 does not adversely affect the operation of the first embodiment in that the feedback loop of the PLL 70 is independent of the clock extracting circuit. The PLL shown in FIG. 8 is well known in the art so that further description will be omitted.

As an alternative, the jitter can be removed through the use of a narrow band-pass filter with the center frequency $f_0$ (such as an LC filter, a cavity resonator, or a surface acoustic wave filter).

Figure 9:
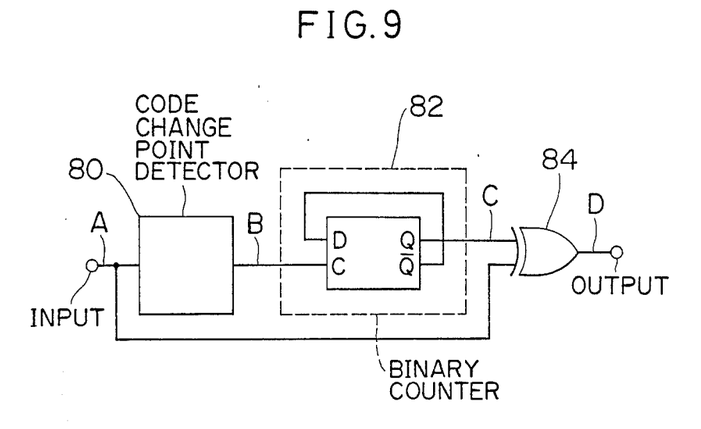
FIG. 9 is a block diagram showing a second preferred embodiment of the present invention.

FIG. 9 is a block diagram showing a second embodiment of the present invention. The FIG. 9 arrangement includes a code change point detector 80, a binary counter 82 formed by a D flip-flop, and an exclusive OR circuit 84. The construction and arrangement of binary counter 82 is well known in the art. Accordingly, a description of same will not be given for simplicity.

The waveforms of signals denoted A through D in FIG. 9 are respectively illustrated in FIGS. 11(A) through 11(D). The biphase modulated signal A is applied to the detector 80 and also to one input of the exclusive OR circuit 84. The output B of the detector 80 is fed to the binary counter 82 which applies the output thereof (C) to the other input of the exclusive OR circuit 84.

Figure 10:
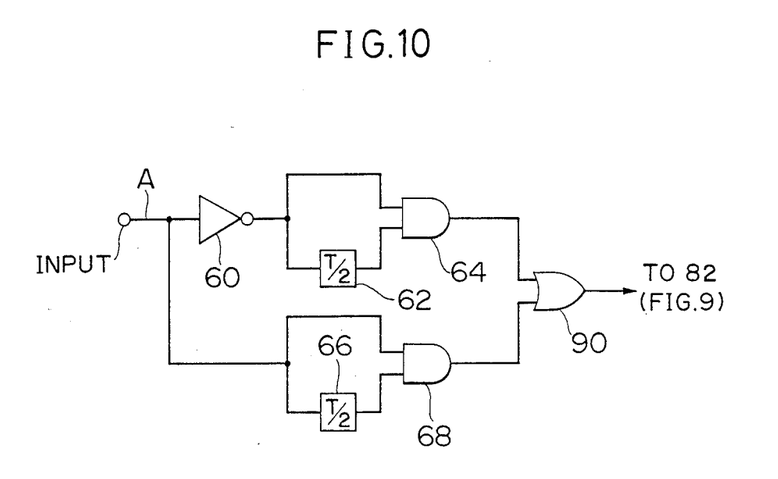
FIG. 10 is a block diagram showing a detailed circuit configuration of the block forming part of the FIG. 9 arrangement.
Figure 11:
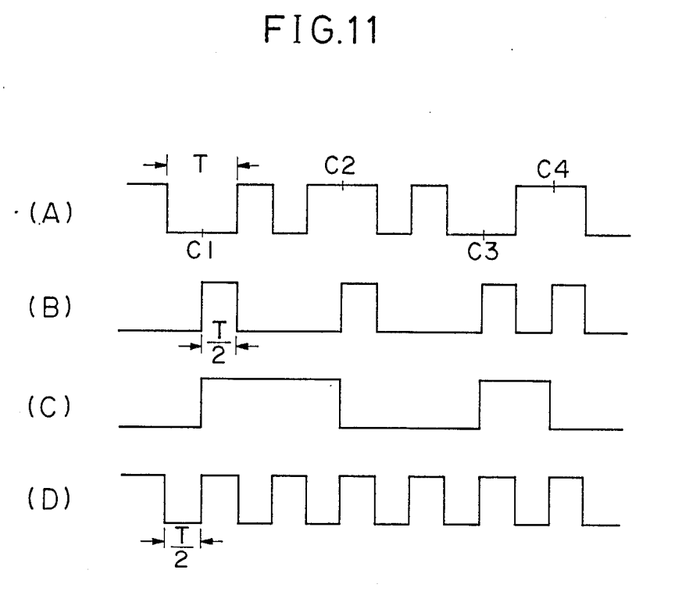
FIG. 11 is a chart showing signal waveforms produced by the second preferred embodiment.

FIG. 10 is a block diagram showing the detail of the detector 80 (FIG. 9). The arrangement of FIG. 10 is identical to that of FIG. 7 except that the former arrangement further includes an OR circuit 90. The operation of the FIG. 10 circuit will be appreciated from the description with respect to FIG. 7.

The PLL 70 shown in FIG. 8 can be provided if necessary.

It will be noted that the present invention is not provided with a decision feedback loop as shown in the prior art. As a consequence, a stable clock signal can be obtained which is not disturbed upon initial energization of the circuit and/or by poor transmission conditions. Further, the present invention is capable of being constructed with simple logic elements and hence is suited to be manufactured by Integrated Circuit techniques.

The foregoing description shows only preferred embodiments of the present invention. Various modifications are apparent to those skilled in the art without departing from the scope of the present invention which is only limited by the appended claims.

What is claimed is:

1. A method of extracting a clock signal from a received biphase modulated signal, said clock signal being utilized to reproduce an original binary data, said method comprising the steps of:
   receiving the biphase modulated signal;
   generating a time point detecting signal which is indicative of time points at each of which a code ONE of the received biphase modulated signal changes to a code ZERO or vice versa; and
   obtaining the clock signal by performing exclusive OR operations between the time point detecting signal and the received biphase modulated signal.

2. A circuit arrangement for extracting a clock signal from a received biphase modulated signal, which comprises:
   a first detector having an input thereof coupled to receive the biphase modulated signal, said first detector being arranged to detect time points at each of which a code ONE of the received biphase modulated signal changes to a code ZERO;
   a second detector having an input thereof coupled to receive the biphase modulated signal, said second detector being arranged to detect time points at each of which a code ZERO of the received biphase modulated signal changes to a code ONE;
   a set-and-reset type flip-flop having one input coupled to one of said first and second detectors, and having another input coupled to the other one of said first and second detectors; and
   an exclusive OR circuit which receives an output of the flip-flop and the transmitted biphase modulated signal, whereby said clock signal is obtainable at an output of said exclusive OR circuit.

3. A circuit arrangement as claimed in claim 2, wherein said first detector includes an inverter having an output thereof coupled to receive the biphase modulated signal, a delay circuit and an AND circuit, said AND circuit having one input coupled to an output of said inverter and having another input coupled via said delay circuit to an output of said inverter; and
   wherein said second detector includes another delay circuit and another AND circuit, said other AND circuit having one input coupled to receive the biphase modulated signal and having another input coupled to receive via said other delay circuit the received biphase modulated signal.

4. A circuit arrangement for extracting a clock signal from a received biphase modulated signal, which comprises:
   a detector having an input thereof coupled to receive the biphase modulated signal, said detector being arranged to detect time points at each of which a code ONE of the received biphase modulated signal changes to a code ZERO or vice versa;

a binary counter having an input thereof coupled to receive an output of said detector; and an exclusive OR circuit having one input coupled to receive an output of said binary counter and another input coupled to receive the biphase modulated signal, whereby the clock signal is obtainable at the output of said exclusive OR circuit.

5. A circuit arrangement for extracting a clock signal from a received biphase modulated signal, which comprises:

a detector having an input thereof coupled to recieve the biphase modulated signal, said detector being arranged to detect time points at each of which a code ONE of the received biphase modulated signal changes to a code ZERO or vice versa, said detector including an inverter having an input thereof coupled to receive the biphase modulated signal, first and second delay circuits, a first AND circuit having one input coupled to receive the output of said inverter and another input coupled via said first delay circuit to receive an output of said inverter, a second AND circuit having one input coupled to receive the biphase modulated signal and another input coupled via said second delay circut to receive the biphase modulated signal, and an OR circuit having two inputs coupled to the outputs of said first and second AND gates;

a binary counter having an input thereof coupled to receive an output of said detector;

an exclusive OR circuit having one input coupled to receive an output of said binary counter and another input coupled to receive the biphase modulated signal, whereby the clock signal is obtainable at the output of said exclusive OR circuit.

* * * * *